(12) United States Patent
Mizutani

(10) Patent No.: US 7,481,883 B2
(45) Date of Patent: Jan. 27, 2009

(54) DROPLET DISCHARGE APPARATUS, COLOR FILTER MANUFACTURING APPARATUS, COLOR FILTER AND METHOD OF MANUFACTURE THEREOF, LIQUID CRYSTAL APPARATUS, AND ELECTRONIC APPARATUS

(75) Inventor: Seigo Mizutani, Suwa (JP)

(73) Assignee: Seiko Epson Corporation (JP)

( * ) Notice: Subject to any disclaimer, the term of this patent is extended or adjusted under 35 U.S.C. 154(b) by 442 days.

(21) Appl. No.: 10/842,235

(22) Filed: May 10, 2004

(65) Prior Publication Data

US 2005/0035997 A1 Feb. 17, 2005

(30) Foreign Application Priority Data

May 14, 2003 (JP) ............................... 2003-135875

(51) Int. Cl.
*B05C 7/06* (2006.01)
*B05C 13/02* (2006.01)
*B41J 2/01* (2006.01)

(52) U.S. Cl. .................... 118/66; 118/313; 347/101; 347/102; 347/179

(58) Field of Classification Search ................. 118/300, 118/66, 313, 46, 58; 347/20, 40, 101–108, 347/179, 172; 430/7, 347; 427/162, 164, 427/165, 168, 64, 256
See application file for complete search history.

(56) References Cited

U.S. PATENT DOCUMENTS 5,757,407 A * 5/1998 Rezanka ..................... 347/102

6,331,384 B1 * 12/2001 Satoi .......................... 430/347
6,786,588 B2 * 9/2004 Koyano et al. ............... 347/100
2001/0055047 A1 * 12/2001 Ohsawa et al. ............... 347/55

FOREIGN PATENT DOCUMENTS

| JP | 2001-033614 | 2/2001 |
|---|---|---|
| JP | 2002-026107 | 1/2002 |
| JP | 2002-033266 | 1/2002 |
| JP | 2002-050668 | 2/2002 |
| KR | 2002-0006469 | 1/2002 |
| KR | 2002-00063739 | 8/2002 |

OTHER PUBLICATIONS

Communication from Korean Patent Office regarding corresponding application.

* cited by examiner

*Primary Examiner*—Yewebdar T Tadesse
(74) *Attorney, Agent, or Firm*—Harness, Dickey & Pierce, P.L.C.

(57) ABSTRACT

A droplet discharge apparatus that forms a pattern in a desired shape on a base material being processed by discharging liquid having pattern-forming substances, includes a drawing section, inside which the base material moves in one direction, the drawing section having a plurality of droplet discharge heads that are arranged in a direction intersecting with the movement direction of the base material, a supply section for supplying the pre-drawing base material toward the drawing section and a removal section for extracting the post-drawing base material from the drawing section, wherein the drawing section, the supply section, and the removal section are arranged along the one direction, and the base material moves relatively from the supply section side to the removal section side with respect to the plurality of droplet discharge heads in the one direction, being also the direction that intersects the arrangement direction of the plurality of droplet discharge heads, while discharging the liquid by the droplet discharge heads.

8 Claims, 9 Drawing Sheets

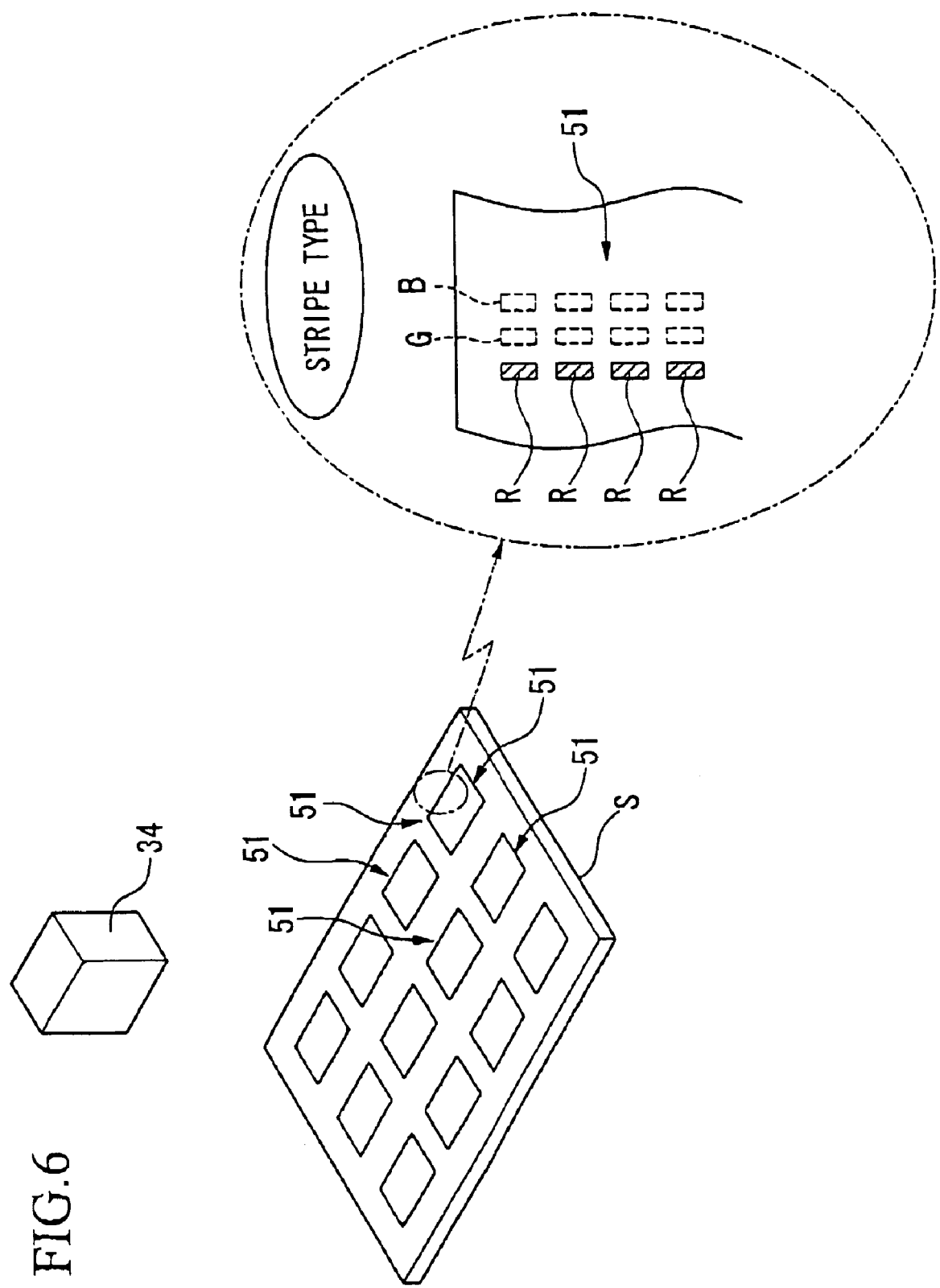

DROPLET DISCHARGE APPARATUS, COLOR FILTER MANUFACTURING APPARATUS, COLOR FILTER AND METHOD OF MANUFACTURE THEREOF, LIQUID CRYSTAL APPARATUS, AND ELECTRONIC APPARATUS

BACKGROUND OF THE INVENTION

1. Field of the Invention

The present invention relates to a droplet discharge apparatus, a color filter manufacturing apparatus, a color filter and a method of manufacture thereof, a liquid crystal apparatus, and an electronic apparatus.

Priority is claimed on Japanese Patent Application No. 2003-135875, filed May 14, 2003, the content of which is incorporated herein by reference.

2. Description of Related Art

In recent years, along with developments in an electronic apparatus such as computer displays and large-scale televisions, there is increasing use of a liquid crystal display apparatus, particularly a color liquid crystal display apparatus. This type of liquid crystal display apparatus usually uses a color filter to color the display image. One type of color filter discharges a predetermined pattern of ink in red (R), green (G), and blue (B) on a substrate of, for example, glass, and forms a colored layer by drying the ink on the substrate. An inkjet droplet discharge apparatus, for example, is used to discharge the ink onto the substrate.

When using an inkjet droplet discharge apparatus, a predetermined amount of ink is discharged by dispensing from the inkjet head to the glass substrate. In this case, it is possible to use an apparatus wherein the inkjet head is secured and the glass substrate is mounted on an XYθ stage, which can move in for example two intersecting directions (X direction, Y direction) and can rotate around a given axis of rotation. In this type of apparatus, after positioning the glass substrate in a predetermined position with respect to the inkjet head by driving the XYθ stage, ink is discharged from the inkjet head while scanning the glass substrate in the X direction and Y direction, so that the ink is discharged at predetermined positions on the glass substrate.

One example of a color filter manufacturing apparatus that uses this type of droplet discharge apparatus is disclosed in Japanese Unexamined Patent Application, First Publication No. 2001-33614. The color filter manufacturing apparatus disclosed in this document is equipped with three coloring apparatuses (droplet discharge apparatuses), each of which can draw three colored layers of R, G, and B; the coloring apparatuses are arranged at the side of a main carrying line that carries a substrate to be processed from a first step to a last step. Furthermore, between the coloring apparatuses and the main carrying line are provided supply conveyors, which supply an uncolored glass substrate to each coloring apparatus, and discharge conveyors, which discharge a glass substrate that has been colored from each coloring apparatus; robots for delivering the glass substrates between the conveyors are provided between the main carrying line and the supply conveyors and the discharge conveyors.

However, the color filter manufacturing apparatus disclosed in Japanese Unexamined Patent Application, First Publication No. 2001-33614 has problems such as the following.

The color filter manufacturing apparatus described above has coloring apparatuses at the side of the main carrying line, performs drawing while delivering the glass substrate, carried from the first step side to the last step side, from the main carrying line into each of the coloring apparatuses, and returns it to the main carrying line after drawing. Consequently, only one glass substrate can be held in each coloring apparatus at the time of drawing, and places are required for returning the glass substrates to the main carrying line after drawing. Therefore, while drawing is being carried out in each coloring apparatus, pre-drawing glass substrates must standby in a position that does not interfere with the post-drawing glass substrates, and an operation to lead the pre-drawing glass substrates into the coloring apparatuses begins when the post-drawing glass substrates have returned to the main carrying line. As a result, this color filter manufacturing apparatus requires a lengthy tact time to process one glass substrate, and its productivity is poor.

Due to this fundamental defect, three coloring apparatuses are provided and arranged in parallel to perform drawing, so as to remedy the above defect. However, since the three coloring apparatuses are arranged at the side of the main carrying line, this apparatus occupies an extremely large space on the color filter production line, and obstructs the apparatus layout and the like of the production line. The more the number of coloring apparatuses is increased in an attempt to raise the processing efficiency, the more the space occupied inevitably increases, making the problem worse. Recently, thirty-inch to sixty-inch large-scale liquid crystal televisions are becoming available in commercial markets, making this problem even more noticeable in large-scale color filter manufacturing apparatuses that are adapted for such televisions.

Furthermore, in the apparatus described above, the glass substrate carrying directions of the main carrying line, and the carrying line that links the main carrying line to each coloring apparatus, differ by 90°, making it necessary to provide various types of carrying apparatuses such as supply conveyors, removal conveyors, robots, and the like, between the main carrying line and the coloring apparatuses. As a consequence, the apparatus constitution becomes complex, as do the drive controls for these carrying apparatuses. Moreover, the pre-drawing glass substrates on the main carrying line are mixed with the post-drawing glass substrates as they flow, requiring controls to separate them.

In recent years, in addition to color filters, consideration is being given to interconnection formation technology, or apparatus formation technology for organic EL (electro-luminescence) elements and the like that use an inkjet system droplet discharge apparatus. The above explanation describes the conventional technology and problematic points of an example of a color filter manufacturing apparatus, but these problematic points also apply to such apparatus formation technology and interconnection formation technology; hence there is a desire to realize a manufacturing apparatus (that is, a droplet discharge apparatus having the manufacturing apparatus) having superior productivity.

This invention has been realized in order to solve the problems mentioned above, and aims to provide a droplet discharge apparatus that is suitable for a production line, has superior productivity and a comparatively simple apparatus constitution, and does not waste occupied space, and also aims to provide a color filter manufacturing apparatus using the droplet discharge apparatus, a color filter, and a method of manufacturing the color filter.

SUMMARY OF THE INVENTION

The first aspect of the present invention is a droplet discharge apparatus that forms a pattern in a desired shape on a base material being processed by discharging liquids having pattern-forming substances, having a drawing section, inside which the base material moves in one direction, the drawing section having a plurality of droplet discharge heads that are arranged in a direction intersecting with the movement direction of the base material, a supply section for supplying the pre-drawing base material toward the drawing section, and a removal section for extracting the post-drawing base material from the drawing section, wherein the drawing section, the supply section, and the removal section are arranged along the one direction, and the base material moves relatively from the supply section side to the removal section side with respect to the plurality of droplet discharge heads in the one direction, being also the direction that intersects the arrangement direction of the plurality of droplet discharge heads, while discharging the liquid by the droplet discharge heads.

Incidentally, the expression "inside which the base material flows in one direction" signifies only that the base material being processed flows in a straight line, and does not refer to the direction of the flow. Therefore, this expression may on occasion signify that the base material flows backwards along a straight line.

That is, in the droplet discharge apparatus of this invention, the drawing section, the supply section, and the removal section, inside which the base material moves in one direction, are arranged along the movement direction of the base material. In other words, the drawing section of the droplet discharge apparatus of this invention is provided midway along the straight carrying line of the base material that links the supply line and the removal line. Then, the base material is moved relatively from the supply section side to the removal section side with respect to the plurality of droplet discharge heads in the one direction (the arrangement direction of the supply section, the drawing section, and the removal section), being also the direction that intersects the arrangement direction of the plurality of droplet discharge heads, while discharging the liquids from the droplet discharge heads so as to form a pattern in the desired shape. That is, since the constitution is such that pre-drawing base materials are supplied from one end of the drawing section, and post-drawing base materials are extracted from the other end of the drawing section, the base materials can be continuously fed into the drawing section, and they can be drawn by using the plurality of droplet discharge heads while carrying the base materials being processed in one direction only. Therefore, in comparison with a conventional apparatus, in which the base materials being processed are delivered from the carrying line into the coloring apparatus one by one, the tact time required for processing one base material can be shortened, achieving an apparatus having excellent productivity.

Furthermore, since the supply section, the drawing section, and the removal section, are arranged in a straight line, the space occupied by the apparatus can be made shorter than in the conventional where the coloring apparatus is provided at the side of the carrying line.

Moreover, since there is no need for a carrying apparatus having a function for changing the carrying direction of the base material, as in the conventional apparatus, the apparatus constitution can be simplified.

In the droplet discharge apparatus of this invention, since drawing is made possible merely by moving the plurality of droplet discharge heads and the base material relatively in the direction, the constitution may be one wherein either the droplet discharge heads or the base material being processed is moved, or both are moved.

However, a comparison of the constitutions shows that it is more desirable that the droplet discharge heads remain secured with respect to the apparatus main body when drawing.

The droplet discharge heads are connected to a great number of pipes and interconnections for driving the heads in order to supply the liquids to the heads; therefore, the apparatus constitution becomes simpler when the base material side is moved, rather than moving the droplet discharge head side.

Preferably, the droplet discharge apparatus further includes a cleaning section for cleaning the base material before drawing, between the supply section and the drawing section.

According to this constitution, since a clean base material can be supplied to the drawing section, drawing mistakes caused by impurities and the like that have become stuck to the substrate can be prevented, and the yield can be increased.

Preferably, the droplet discharge apparatus further includes a surface amending section for performing surface amendment of the base material so as to improve wetting characteristics with respect to the liquid, between the supply section and the drawing section. Here, "surface amendment to improve leak-characteristics with respect to liquid" includes repellent processing in regions where the liquids are to be discharged, and also attractive processing in regions where liquids are not to be discharged.

According to this constitution, liquid can be discharged reliably in desired regions of the base material, preventing problems such as ink being applied in regions other than the desired regions, or ink leaking in the desired regions and not spreading, and the like, thereby increasing the yield.

Preferably, the droplet discharge apparatus further includes a heating section for heating the liquids that are discharged onto the base material, between the drawing section and the removal section.

According to this constitution, after drawing, the liquids that have been discharged on the base material are heated, volatilizing solvents contained in the liquid and burning the liquid. Consequently, for example, when a different type of fluid body is discharged in a subsequent step, mixing of the liquid can be prevented.

Preferably, the droplet discharge apparatus further includes a checking section for checking the drawing state of the base material after drawing, between the drawing section and the removal section.

According to this constitution, by checking the drawing state of the base material after drawing, drawing irregularities can be detected, and substrates on which the liquid have been correctly or faultily improperly discharged can be identified. Depending on the case, faulty base materials being processed can be passed on to a correcting operation.

the second aspect of the present invention is a color filter manufacturing apparatus for manufacturing a color filter equipped with colored layers of different colors, having a plurality of the droplet discharge apparatuses, wherein the liquid used in each droplet discharge apparatus containing coloring elements of respectively different colors, so that the droplet discharge apparatuses form colored layers of different colors.

That is, the color filter manufacturing apparatus of this invention includes a plurality of droplet discharge apparatuses for forming colored layers in different colors, e.g. R, G, and B, each of these droplet discharge apparatuses being composed of the droplet discharge apparatus described above. According to this aspect, it is possible to realize a color filter manufacturing apparatus having excellent productivity, a simple apparatus constitution, and occupying a comparatively small space.

Preferably, the color filter manufacturing apparatus further includes a heating apparatus provided in the last level of the plurality of droplet discharge apparatuses, for simultaneously heating the colored layers of different colors that were formed by the droplet discharge apparatuses.

According to this constitution, it is possible to volatilize solvents contained in the liquid that form the colored layers of the color filter, and burn the liquid. For example, in the case where a heating section for heating the liquid is provided in each droplet discharge apparatus, this heating section may be used for provisional heating, and the heating apparatus may be used in main burning so as to optimize the heating conditions. In this case, it becomes possible to match the burning to the characteristics of the individual colored layers, thereby obtaining a high-quality color filter.

The third aspect of the present invention is a method of manufacture of a color filter equipped with colored layers of different colors, comprising the step of forming the colored layers by using the color filter manufacturing apparatus described above.

According to this aspect, it becomes possible to manufacture a color filter having superior productivity, and to reduce the manufacturing cost.

The fourth aspect of the present invention is a color filter having colored layers of different colors, manufactured by using the manufacturing method described above.

According to this aspect, it is possible to provide an inexpensive, high-quality color filter.

The fifth aspect of the present invention is a liquid crystal apparatus that is inserted between a pair of substrates, comprising the color filter described above.

According to this aspect, it becomes possible to provide an inexpensive, high-quality liquid crystal apparatus.

The sixth aspect of the present invention is an electronic apparatus having the liquid crystal apparatus described above.

According to this aspect, it is possible to realize an electronic apparatus having an inexpensive, high-quality color liquid crystal display section.

BRIEF DESCRIPTION OF THE DRAWINGS

FIG. 6 is a perspective view showing a substrate for forming a color filter.

DETAILED DESCRIPTION OF THE INVENTION

Next, preferred embodiments of the invention will be explained with reference to the diagrams.

Figure 1:
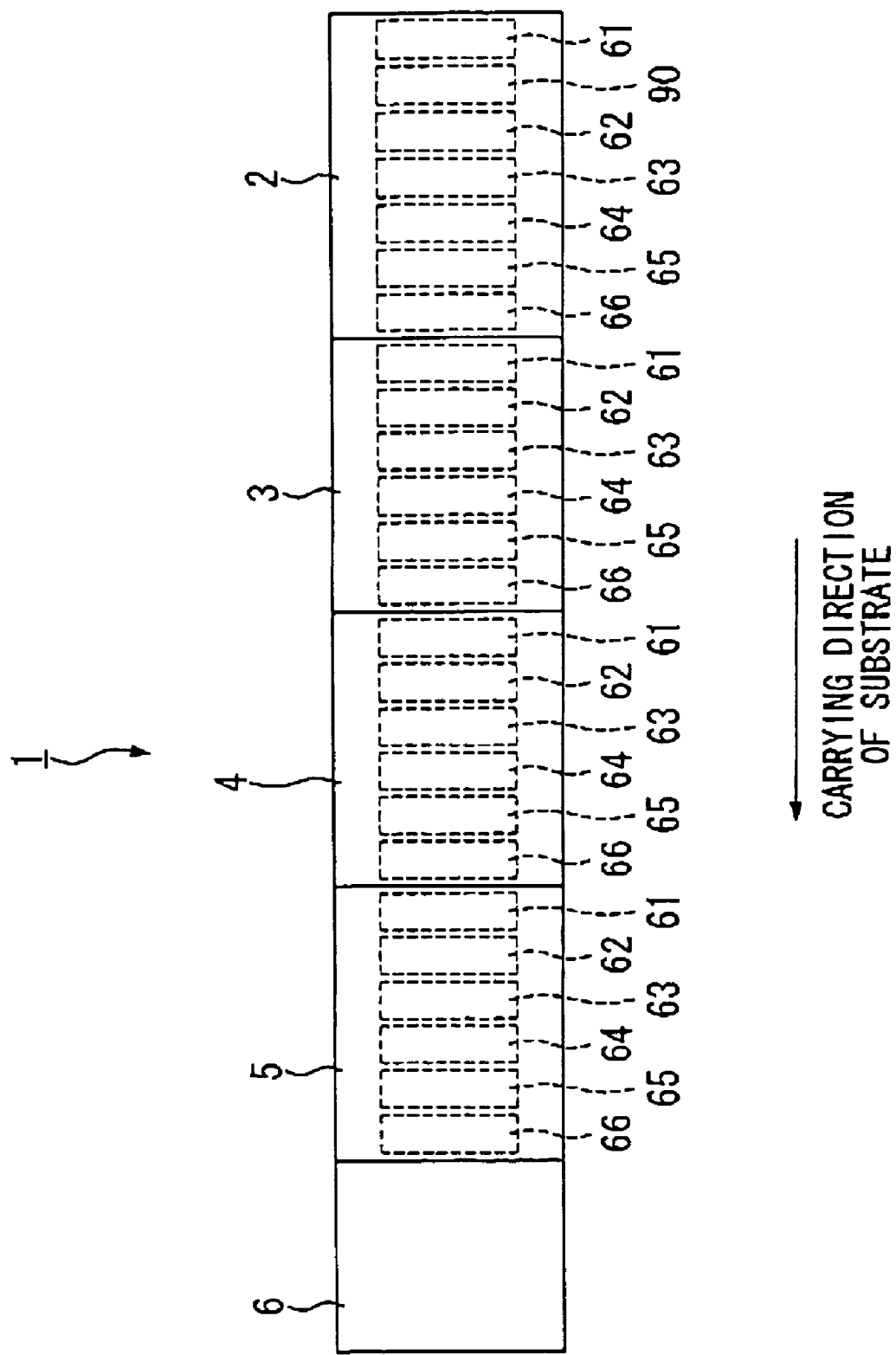
FIG. 1 is a schematic constitution diagram of a color filter manufacturing apparatus in an embodiment of the present invention.

FIG. 1 is a schematic constitution diagram of a color filter manufacturing apparatus of this embodiment, being an apparatus for manufacturing a color filter having colored layers in three colors of R, G, and B.

The color filter manufacturing apparatus 1 of this embodiment, as shown in FIG. 1, includes, from the upstream side of carrying direction of the substrate, an ink receptive layer formation apparatus 2, an R color layer formation apparatus 3, a G color layer formation apparatus 4, a B color layer formation apparatus 5, and a main burning apparatus 6 (heating apparatus), these apparatuses being connected by a given carrying apparatus (not shown). A transparent substrate (substrate being processed) includes glass, plastic, and the like, in which are formed partitions (also known as banks) for segregating the patterns of colored layers of R, G, and B, and is supplied to this color filter manufacturing apparatus 1. The ink receptive layer formation apparatus 2 is an apparatus for forming an ink receptive layer of resin composite in a region that is segregated by the partitions, as an under-layer. The R color layer formation apparatus 3, the G color layer formation apparatus 4, and the B color layer formation apparatus 5, are apparatuses for respectively applying liquids having inks of R, G, and B, for the colored layers. The main burning apparatus 6 is an apparatus for heating and burning the liquids having inks of R, G, and B, in a single operation after they have been applied. Of these apparatuses, four of the droplet discharge apparatus (inkjet apparatus) of this invention are used as the ink receptive layer formation apparatus 2, the R color layer formation apparatus 3, the G color layer formation apparatus 4, and the B color layer formation apparatus 5.

Figure 2:
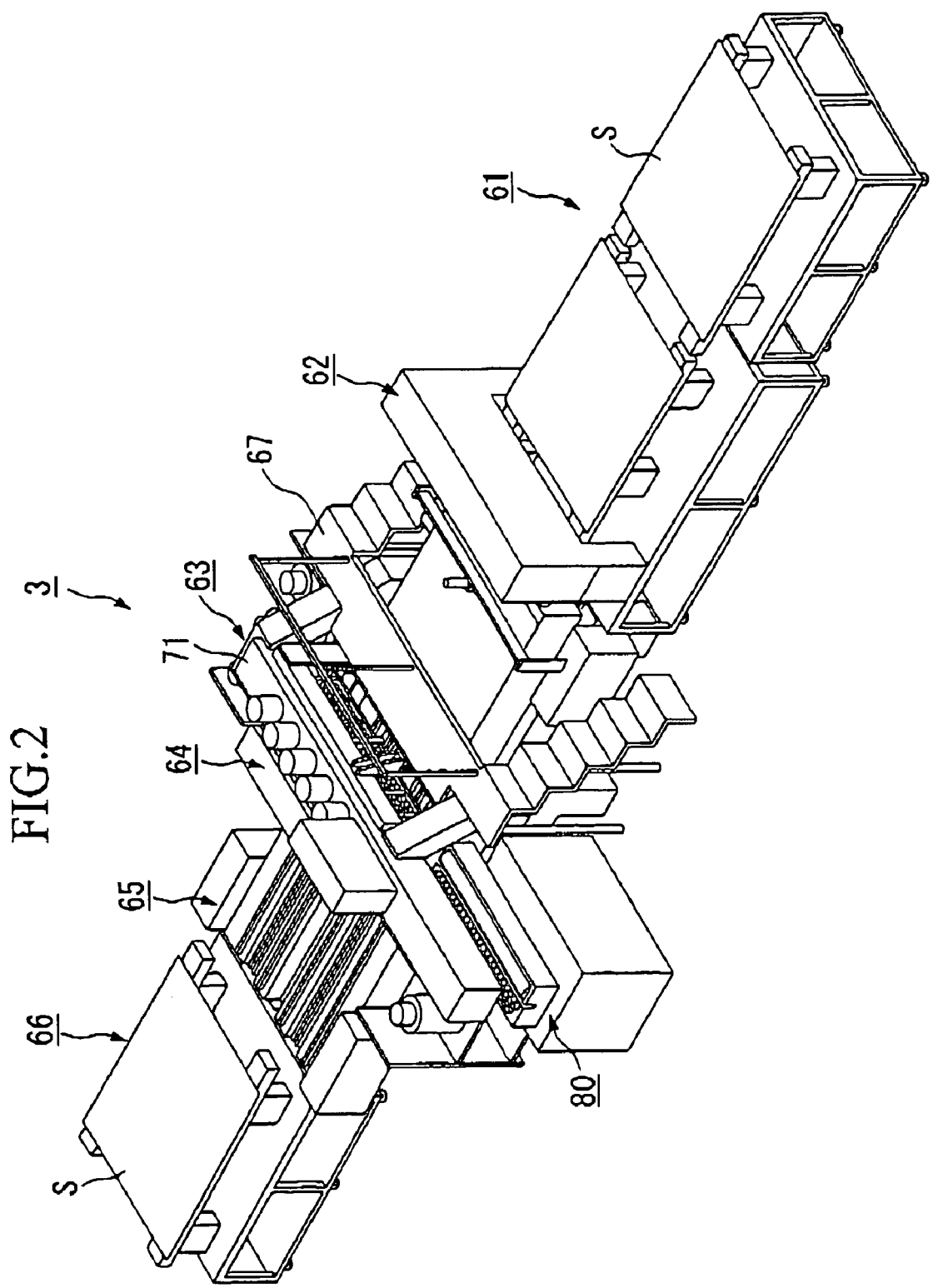
FIG. 2 is a perspective view showing a droplet discharge apparatus of a color filter manufacturing apparatus in an embodiment of the present invention.

FIG. 2 is a schematic constitutional perspective view showing primary parts of the droplet discharge apparatus of the color filter manufacturing apparatus 1 in this embodiment. Since the basic constitutions of the ink receptive layer formation apparatus 2, the R color layer formation apparatus 3, the G color layer formation apparatus 4, and the B color layer formation apparatus 5, which use the droplet discharge apparatus, are all the same, the R color layer formation apparatus 3 will be explained here by way of example.

As shown in FIG. 2, the R color layer formation apparatus 3 includes a supply section 61, a surface amending section 62, a drawing section 63, a checking section 64, a provisional burning section 65, and a removal section 66, arranged from the upstream side to the downstream side (from the right side to the left side in FIG. 2). The overall flow of the processing is such that a pre-drawing substrate S, which was supplied from the supply section 61, is repellent processed and attractive processed in the surface amending section 62, R-ink is discharged and drawn into a predetermined region segregated by the partitions in the drawing section 63. Then, the drawing state is checked in the checking section 64, the ink is provisionally burned in the provisional burning section 65, and the post-drawing substrate is extracted by the removal section 66. In the present apparatus, the sections 61 to 66 are arranged in a straight line along the direction of the flow of the substrate S. Incidentally, since the apparatus 3 is a large-scale apparatus capable of processing large-scale substrates, a path 67 is provided so that the operator can carry out maintenance of a head unit, described later.

The supply section 61 and the removal section 66 can be configured by any given substrate-carrying device, e.g. a roller conveyor, a belt conveyor, and the like. The surface amending section 62 includes a plasma processing chamber, and carries out repellent processing by means of plasma-processing ($O_2$ plasma-processing) using oxygen as the reactive gas in the atmosphere, so that the surface of the substrate and the side faces of the partitions are repellent processed. Attractive processing is performed by means of plasma processing ($CF_4$ plasma-processing) using tetrafluoromethane (carbon tetrafluoride) as the reactive gas in the atmosphere, so that the top faces of the partitions are attractive processed.

Figure 3:
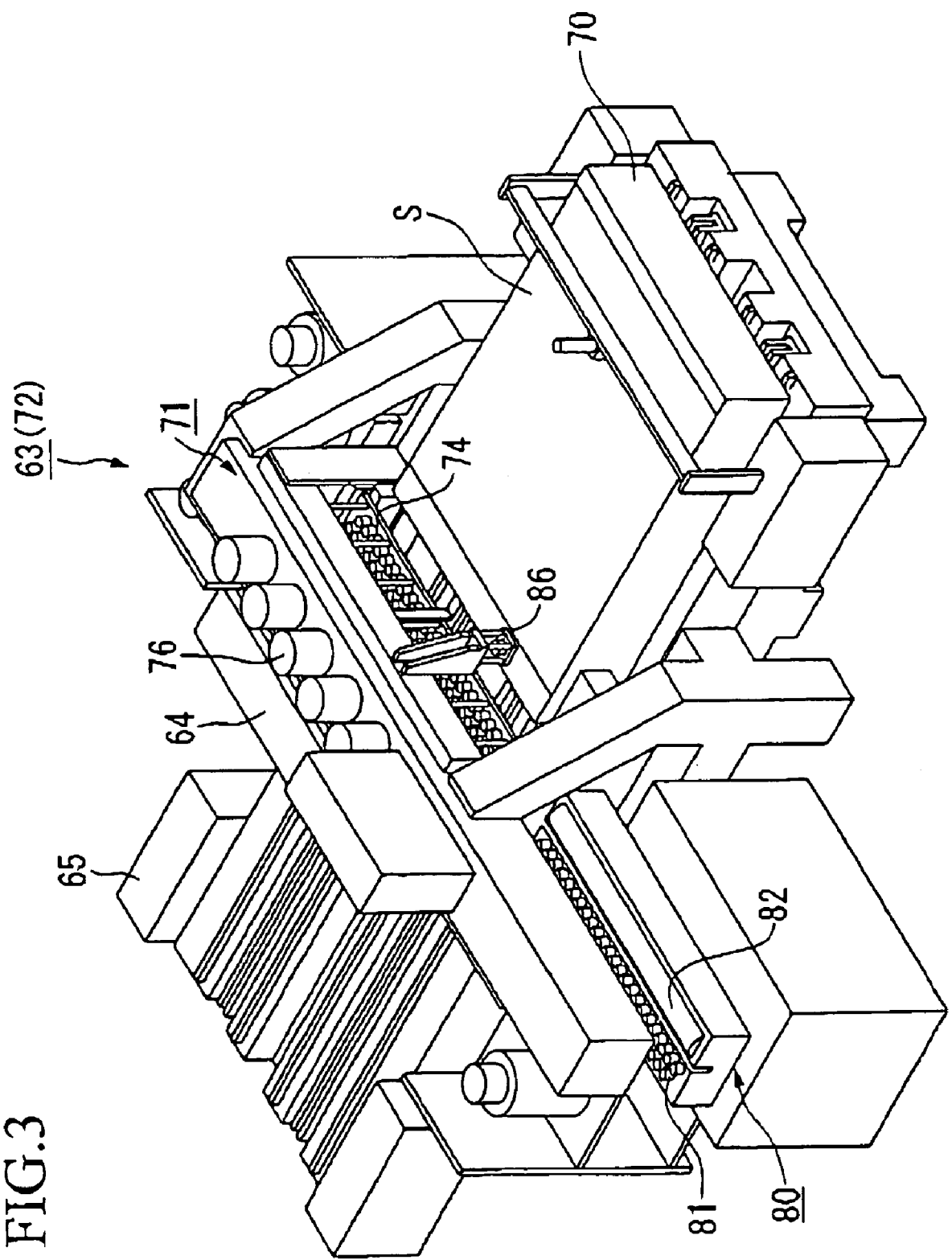
FIG. 3 is a perspective view showing a drawing section of a droplet discharge apparatus.

FIG. 3 is a schematic constitutional perspective view showing only the environs of the drawing section 63.

As shown in FIG. 3, the drawing section 63 is configured to adsorb-hold the substrate S on a stage 70 that can rotate in one direction, and carry the substrate in that state in one direction (from the right side to the left side of FIG. 3); a head unit 71 extends at a right angle to the carrying direction of the substrate S and is installed in the apparatus main body. That is, the droplet discharge apparatus 72 of the present embodiment is configured so that the droplet discharge head side does not move, and only the substrate side moves. The head unit 71 is fitted with a large-scale reference plate 74, which a plurality of droplet discharge heads 34 are secured to, these being arranged in a direction that intersects the carrying direction of the substrate S at a right angle.

Figure 4A:
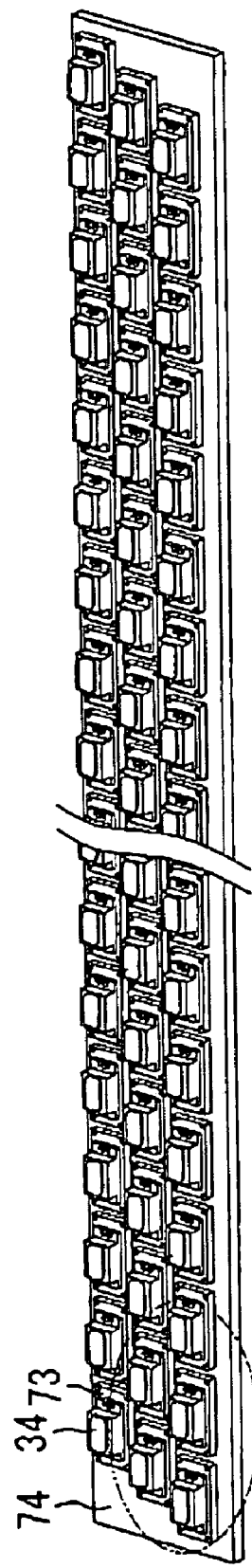
FIGS. 4A and 4B are perspective views showing arrangements of droplet discharge heads.
Figure 4B:
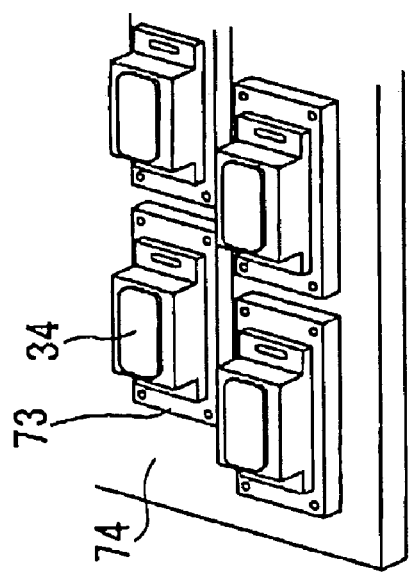

FIG. 4A is a perspective view of the large-scale reference plate 74 seen from the nozzle side of the droplet discharge heads 34, and FIG. 4B is an enlarged view of one droplet discharge head 34 (an enlarged view of the inside of the circle shown by the reference code H in FIG. 4A). As shown in these diagrams, one droplet discharge head 34 is secured to one small-scale reference plate 73, the same number of small-scale reference plates 73 as the number of heads being secured to one large-scale reference plate 74. In this embodiment, multiple droplet discharge heads 34 are arranged in three rows, at positions deviating in the long direction of the large-scale reference plate 74 between the rows. Furthermore, each droplet discharge head 34 has a plurality of nozzles (dispensing holes, not shown in FIG. 4). According to this constitution, the head unit 71 can discharge ink droplets at a predetermined pitch over a long length of, for example, several meters in the long direction of the large-scale reference plate 74, i.e. the direction at a right angle to the carrying direction of the substrate S. Then, ink droplets can be discharged onto the substrate S while carrying it along the direction that intersects at a right angle with the arrangement direction of the droplet discharge heads 34. Furthermore, reference code 76 in FIG. 3 represents an ink tank. The ink tank 76 stores ink, which it supplies via unillustrated pipes to the droplet discharge heads 34.

Figure 5A:
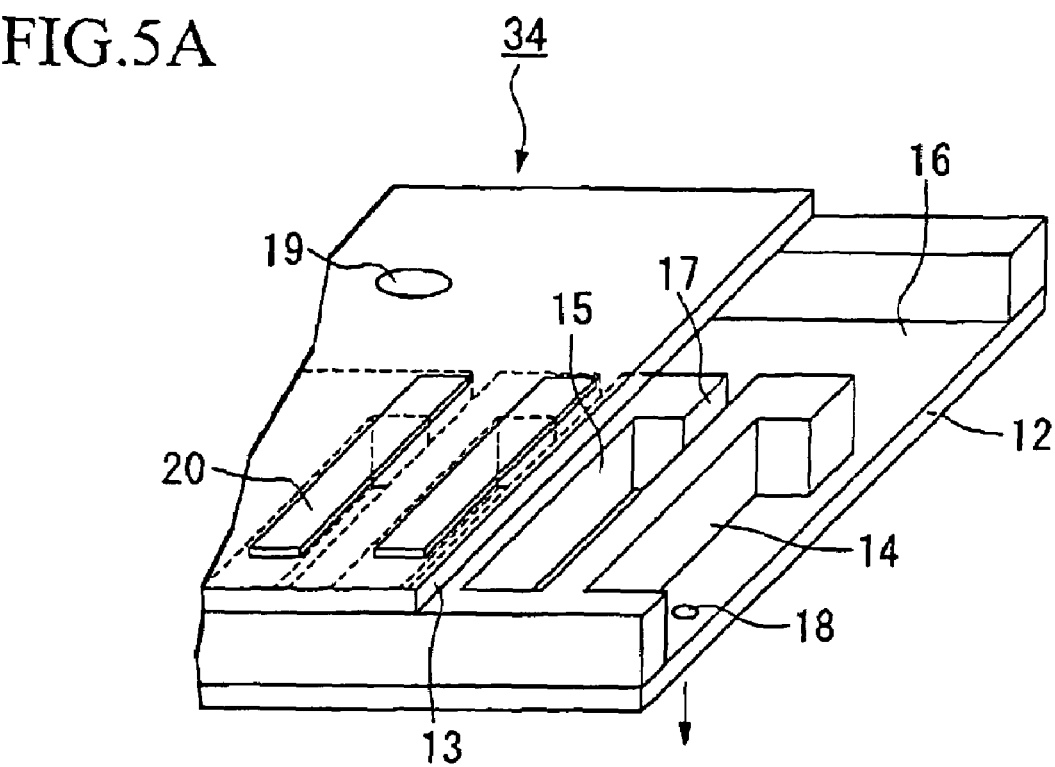
FIGS. 5A and 5B are perspective views showing the internal constitution of a droplet discharge head.

The droplet discharge head 34 discharges liquid by using pressure waves obtained by compressing the liquid chamber by using, for example, a piezoelectric element; for this reason, as described above, the droplet discharge head 34 has a plurality of nozzles arranged in one row or a plurality of rows. An example of the constitution of the droplet discharge head 34 will be explained; as shown in FIG. 5A, the droplet discharge head 34 is fitted with a nozzle plate 12 of, for example, stainless steel, and a vibrating plate 13, which are joined together via a dividing member (reserve plate) 14. The dividing member 14 forms a plurality of spaces 15 and a fluid stop 16 between the nozzle plate 12 and the vibrating plate 13. The spaces 15 and the fluid stop 16 are filled with ink, and are connected together via a supply hole 17. Furthermore, a nozzle for spraying the ink from the spaces 15 is formed in the nozzle plate 12. A hole 19 for supplying the ink to the fluid stop 16 is formed in the vibrating plate 13.

Figure 5B:
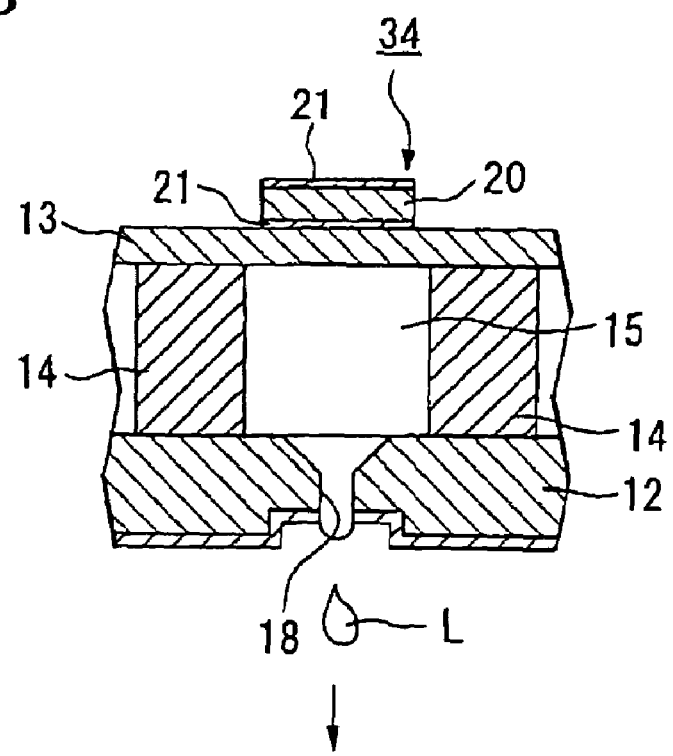

Furthermore, as shown in FIG. 5B, a piezoelectric element 20 is joined to the top face of the opposite side to the face of the vibrating plate 13 that faces the space 15. This piezoelectric element 20 is provided between a pair of electrodes 21, and, when conducting electricity, bends so as to protrude to the outside. Then, since the vibrating plate 13 is joined to the piezoelectric element 20 according to this constitution, the vibrating plate 13 simultaneously bends to the outside together with the piezoelectric element 20, whereby the capacity of the space 15 increases. Therefore, an amount of ink that corresponds to the increase in the capacity of the space 15 flows from the fluid stop 16 through the supply hole 17. Furthermore, when the electrical conduction to the piezoelectric element 20 is terminated in this state, the piezoelectric element 20 and the vibrating plate 13 return to the original shapes.

Therefore, since the space 15 also returns to its original capacity, the pressure of the ink inside the space 15 increases, and an ink droplet L is discharged from the nozzle 18 toward the substrate.

Incidentally, the inkjet method of the droplet discharge head 2 may be a method other than the piezoelectric type using the piezoelectric element 20 described above; for example, it is acceptable to use a method that uses an electricity-heat converter as the energy-generating element.

As shown in FIG. 3, an absorbing/cleaning section 80 is provided at the side of the long direction of the head unit 71. The absorbing/cleaning section 80 performs an absorbing/cleaning operation to the droplet discharge heads 34 at a predetermined frequency that is sufficient to prevent mistaken dispensation resulting from blockage and the like of the droplet discharge heads 34. The specific constitution of the absorbing/cleaning section 80 includes a capping unit 81 for sealing the nozzles of the droplet discharge heads 34 at the time of absorbing, and a wiper 82 for wiping each nozzle and the area around it. Furthermore, downstream from the head unit 71 there is provided the checking section 64 for checking the drawing state of the substrate S after drawing, that is, checking whether the ink droplets have been reliably discharged at the predetermined positions. The checking section 85 is composed of, for example, a line sensor using a CCD or the like.

Moreover, in the case of this embodiment, when the checking section 85 has discovered a mistaken place where the ink is not being discharged at the predetermined position, a correcting head 86 corrects the mistake by re-dispensing ink only at the mistaken place; the correcting head 86 is provided upstream from the head unit 71. Since the correcting head 86 is provided upstream from the head unit 71, the stage 70 moves in the reverse direction (from the left side of FIG. 3 to the right side) only at the time of correcting. The correcting head 86 has only one droplet discharge head 34, and can move in direction intersecting the carrying direction of the substrate S at a right angle. Alternatively, the correcting head 86 may be provided downstream from the head unit 71, in which case the stage 70 need not move in the reverse direction. Furthermore, the provisional burning section 65 is provided on the downstream side of the checking section 85, and uses, for example, a laser drying system. Burning conditions of the provisional burning section are the optimum ones for each of the respective colors R, G, and B.

The R color layer formation device 3 has been described above as an example of the constitution of the droplet discharge apparatus, in which only the ink receptive layer formation apparatus 2 in the first level of the color filter manufacturing apparatus 1 is fitted with a cleaning section 90 upstream from the surface amending section 62. The substrate S with partitions is supplied to the ink receptive layer formation apparatus 2, and the cleaning section 90 cleans the substrate S by a method such as wet-cleaning or ozone-cleaning prior to surface amendment, so that a clean substrate S is supplied to the surface amending section 62. This constitution prevents drawing mistakes caused by impurities and the like that have become stuck to the substrate S, and thereby increases the yield.

Subsequently, one example of a color filter manufacturing method using the color filter manufacturing apparatus 1 of this embodiment will be explained. As shown in FIG. 6, the color filter manufacturing method using the color filter manufacturing apparatus 1 described above can be applied in a case where a plurality of color filter regions 51 are arranged in a matrix-like shape on a rectangular substrate S with the aim of increasing productivity. By cutting the substrate S later, the color filter regions 51 can be used as individual filters suitable for a liquid crystal display apparatus. Incidentally, as shown in FIG. 6, in this example, predetermined patterns for R ink, G ink, and B ink, are formed in a conventionally known stripe pattern in each color filter region 51. Instead of stripes, the pattern may be formed in a mosaic, delta, square, and the like.

Figure 7A:
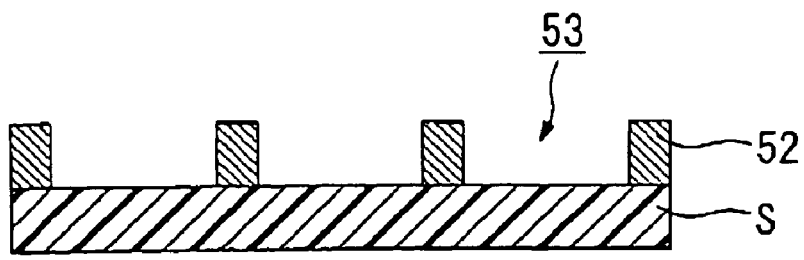
FIGS. 7A to 7G are cross-sectional views of sequential steps of a manufacturing method of a color filter.

To form such a color filter region 51, firstly, as shown in FIG. 7A, a black matrix 52 is formed on one face of a transparent substrate S. When forming this black matrix 52, a resin that is not light-permeable (or black resin) is applied at a predetermined thickness (e.g. approximately 2 μm) by a method such as spin coating, and patterned by photolithography. The minimum display element enclosed by the lattice of the black matrix 52, that is, the filter element 53, has, for example, a width of approximately 30 μm in the X axis direction and a length of approximately 100 μm in the Y axis direction. This black matrix is tall enough to function as a partition when dispensing ink.

Figure 7B:
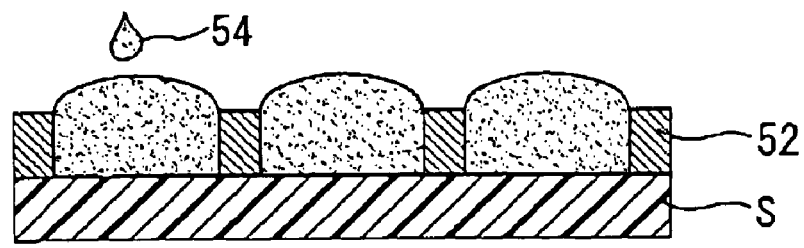
Figure 7C:
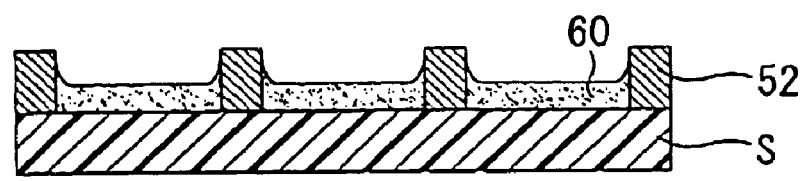

Next, as shown in FIG. 7B, an ink droplet 54 (liquefied body) containing resin composite that will form the ink receptive layer is discharged from the droplet discharge head 34 of the ink receptive layer formation apparatus 2 in the color filter manufacturing apparatus 1 of this embodiment, and discharged onto the substrate S. The amount of the ink droplet 54 to be discharged should be one that is sufficient after considering decrease in the volume of the ink during the heating process. Next, the ink droplet is burned in the burning section of the ink receptive layer formation apparatus 2, obtaining the ink receptive layer 60 shown in FIG. 7C.

Figure 7D:
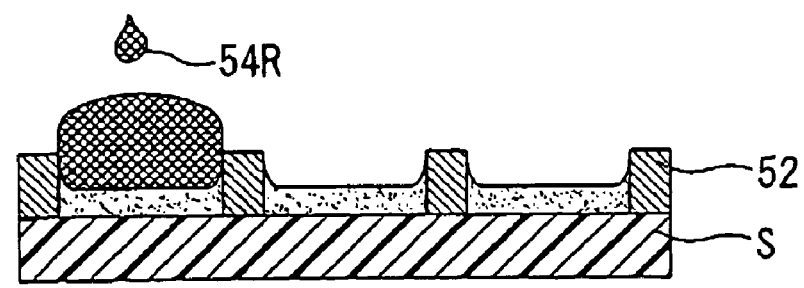
Figure 7E:
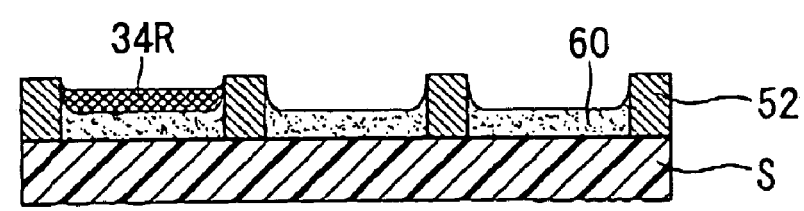
Figure 7F:
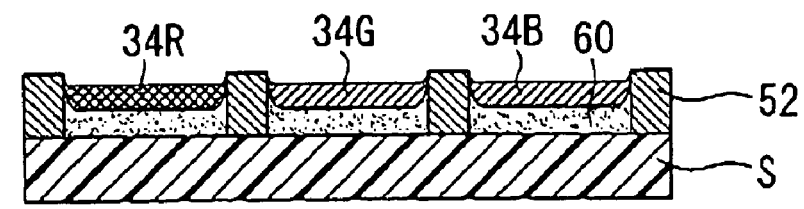

Next, as shown in FIG. 7D, an R ink droplet 54 is discharged from the droplet discharge head 34 of the R color layer formation device 3, and is discharged onto the substrate S. The amount of the R ink droplet 54 to be discharged should be one that is sufficient after considering decrease in the volume of the ink during the heating process. Next, the ink droplet is burned in the provisional burning section 65 of the R color layer formation device 3, obtaining the P colored layer 34R shown in FIG. 7E. The above steps are repeated in the G color layer formation device 4 and the B color layer formation device 5, sequentially forming the G colored layer 34G and the B colored layer 34B, as shown in FIG. 7F. After the R colored layer 34R, the G colored layer 34G, and the B colored layer 34B, have all been formed, they are burned together in the main burning device 6.

Figure 7G:
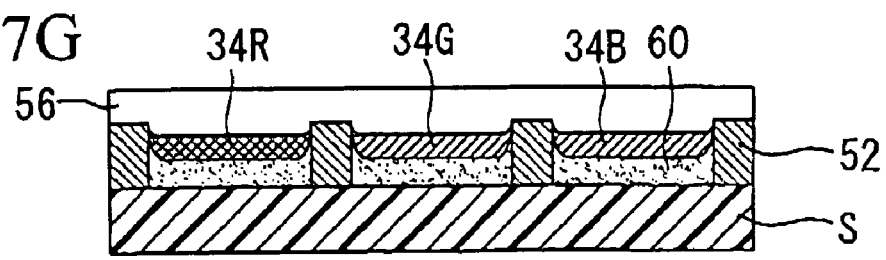

Then, the substrate S is flattened, and an overcoat film (protective film) for covering the colored layers 34R, 34G, and 34B, and the black matrix 52, is formed as shown in FIG. 7G, so as to protect the colored layers 34R, 34G, and 34B. The overcoat film 56 can be formed by a method such as spin coating, roll coating, ripping, and the like, or by using a droplet discharge apparatus in the same way as when forming the colored layers 34R, 34G, and 34B.

The droplet discharge apparatus 72 that includes the color filter manufacturing apparatus 1 of this embodiment is equipped with the drawing section 63 midway along the straight-line substrate carrying line, which joins the supply section 61 and the removal section 66, and, while moving the substrate S in the direction that intersects the arrangement direction of the plurality of droplet discharge heads 34, forms a pattern of the desired shape by discharging ink from the droplet discharge heads 34. In other words, since the constitution is such that pre-drawing substrates S are supplied from one end of the drawing section 63, and post-drawing substrates S are extracted from the other end of the drawing section 63, the substrates S can be continuously fed into the drawing section 63, and they can be drawn by using the plurality of droplet discharge heads 34 while carrying the substrates S in one direction only. Therefore, in comparison with a conventional apparatus in which the substrates S are delivered from the carrying line into the coloring apparatus one by one, the tact time required for processing one substrate can be shortened, achieving an apparatus having excellent productivity.

Furthermore, since the supply section 61, the drawing section 63, and the removal section 66, are arranged in a straight line, the space occupied by the apparatus can be made shorter than in the conventional where the coloring apparatus is provided at the side of the carrying line. Moreover, since there is no need for a carrying apparatus having a function for changing the carrying direction of the substrate being processed, as in the conventional apparatus, the apparatus constitution can be simplified.

Furthermore, since the droplet discharge apparatus 72 is equipped with the surface amending section 62, the substrate surface can be repellent processed and attractive processed prior to dispensing the ink, and ink can be reliably discharged at the desired regions on the substrate. Therefore, problems such as ink being applied in regions other than the desired regions, or ink leaking in the desired regions and not spreading, and the like, can be prevented, increasing the yield. Furthermore, since the provisional burning section 65 is provided downstream from the drawing section 63, ink that has been discharged on the substrate can be provisionally burned after drawing. As a consequence, when a different type of ink is discharged in the next step, mixing of the inks can be prevented. Moreover, since the main burning device 6 is provided at the most downstream side of the color filter manufacturing apparatus 1, the R, G, and B inks can be burned in a single operation. This constitution optimizes the respective heating conditions for provisional burning and main burning, and thereby makes it possible to match the burning to the characteristics of the individual colored layers of R, G, and B, obtaining a high-quality color filter. Further, since the checking section 64 checks the drawing state, drawing irregularities can be detected, and substrates on which the ink has been correctly or faultily improperly discharged can be identified. Depending on the case, faulty substrates can be passed on to a correcting operation.

Figure 8:
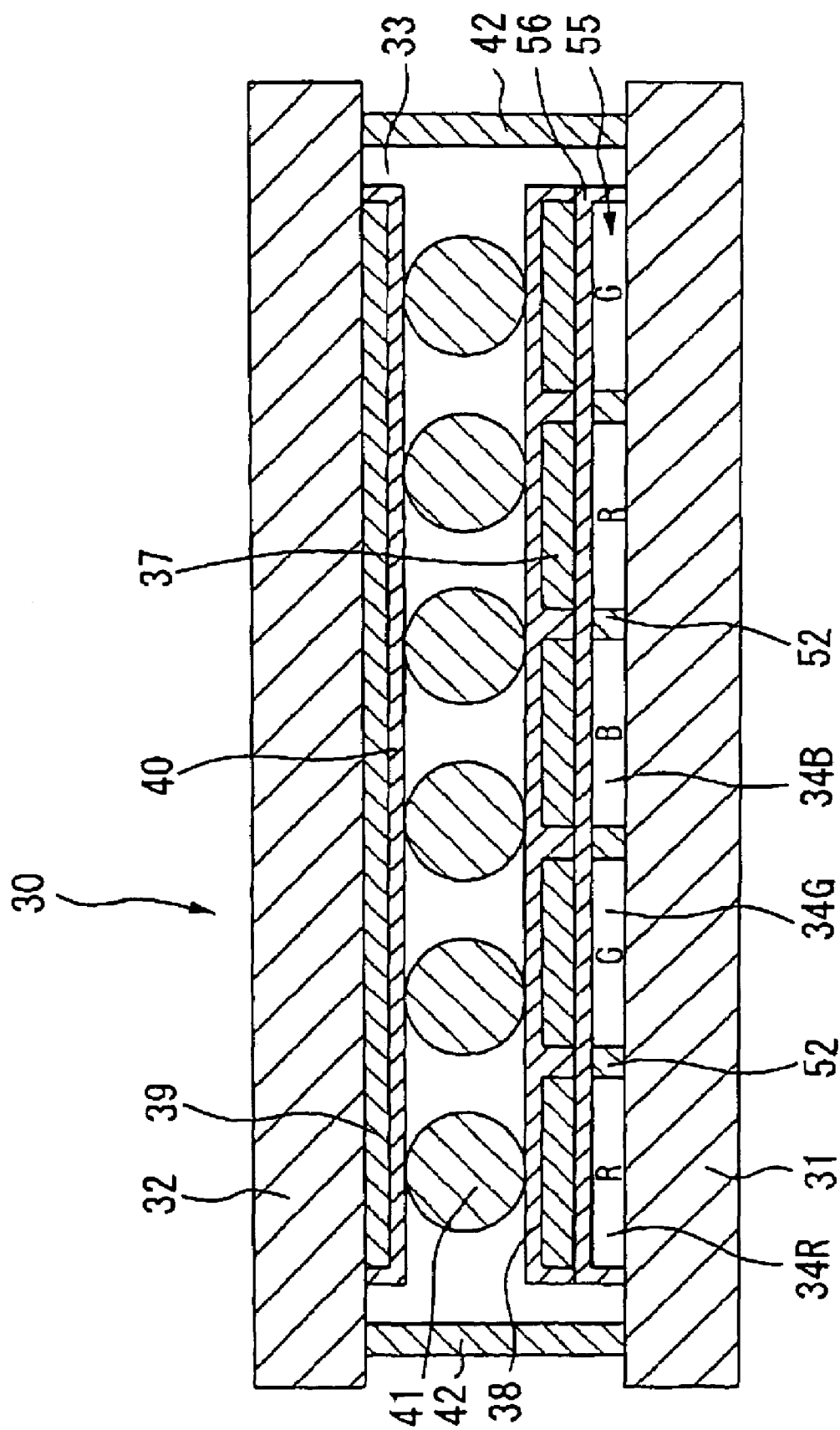
FIG. 8 is a cross-sectional view of a liquid crystal apparatus in an embodiment of the present invention.

Subsequently, an embodiment of a liquid crystal apparatus (electro-optical apparatus) having the above-mentioned color filter is shown. FIG. 8 is a diagram showing a passive matrix liquid crystal apparatus, in which reference number 30 represents the liquid crystal apparatus. This liquid crystal apparatus 30 is a permeable type, in which a liquid crystal layer 33 comprised of an STN (super twisted nematic) liquid crystal or the like, is inserted between a pair of glass substrates 31 and 32.

The color filter 55 described above is formed on the inner face of the glass substrate 31. The color filter 55 comprises the colored layers 34R, 34G, and 34B in the colors of R, G, and B, respectively, these being arranged in regular formation. Black matrixes 52 are formed between the colored layers 34R (34G, 34B). Then, in order to flatten and thereby eliminate the steps created by the color filter 55 and the black matrixes 52, an overcoat film (protective film) 56 is formed over the color filter 55 and the black matrixes 52. A plurality of electrodes 37 are formed in stripes on top of the overcoat film 56, and an alignment film 38 is formed over the electrodes 37.

A plurality of electrodes 39 are formed in stripes on the inner face of the other glass substrate 32 at right angles to the electrodes on the color filter 55 side, and an alignment film 40 is formed over the electrodes 39. Incidentally, the colored layers 34R, 34G, and 34B, of the above-mentioned color filter 55 are arranged at positions intersecting the electrodes 39 and 37 on the respective glass substrate 32. Furthermore, the electrodes 37 and 39 are formed from a transparent conductive substance such as ITO (indium tin oxide). Moreover, unillustrated polarizing plates are provided to the outer faces of the glass substrate 32 and the color filter 55, and spacers 41 for maintaining a constant cell gap between the substrates 31 and 32 are provided between the glass substrates 31 and 32. Moreover, seal materials 42 for inserting the liquid crystal 33 are provided between the glass substrates 31 and 32.

Since the liquid crystal apparatus 30 of this embodiment utilizes the color filter 55 that is manufactured by using the color filter manufacturing apparatus 1 described above, an inexpensive, high-quality color liquid crystal apparatus can be realized.

Subsequently, a specific example of an electronic apparatus fitted with a display device having the above liquid crystal apparatus will be explained.

Figure 9:
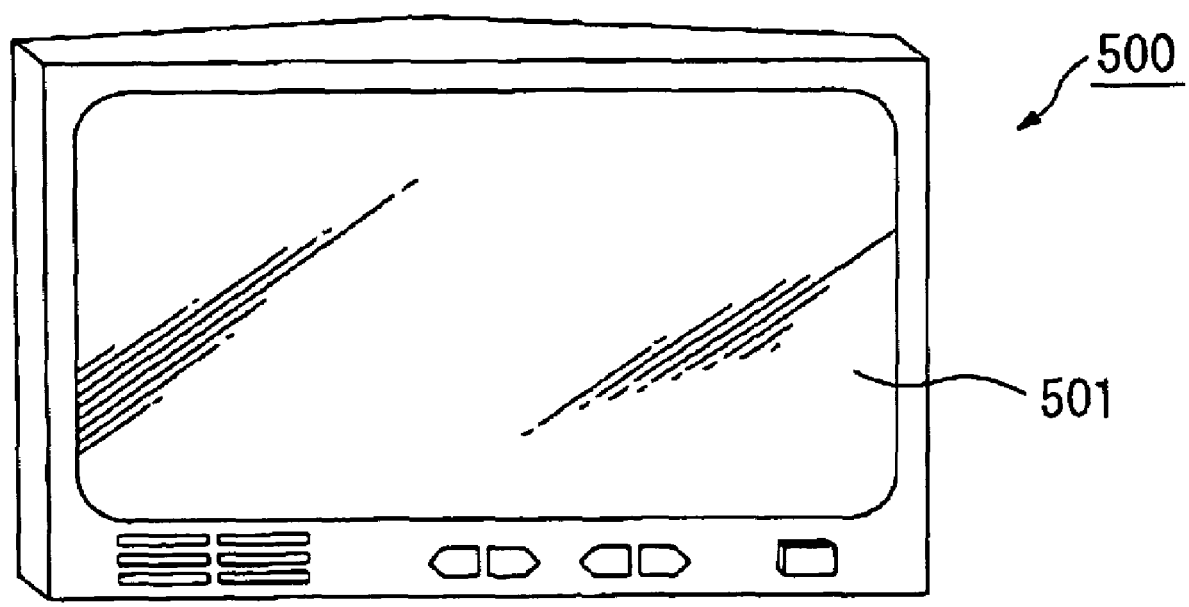
FIG. 9 is a perspective view of a liquid crystal television in an embodiment of an electronic apparatus of the present invention.

FIG. 9 is a perspective view of one example of a liquid crystal television.

In FIG. 9, reference numeral 500 represents a liquid crystal television main body, and reference numeral 501 represents a liquid crystal display section fitted with a liquid crystal apparatus according to the embodiment described above. In this way, since the electronic device shown in FIG. 9 is fitted with the liquid crystal apparatus according to the embodiment described above, the electronic apparatus having an inexpensive, high-quality, color liquid crystal display can be realized.

Incidentally, the technological field of this invention is not limited to the embodiments described above, and can be modified in various ways without digressing from the principle features of the invention. For example, the specific constitution and the like of the detailed parts of the color filter manufacturing apparatus of the embodiment described above can be modified as appropriate. Furthermore, although the above embodiment describes an example where the droplet discharge apparatus of this invention is applied in the manufacture of a color filter, it can be applied not only in color filters but also in technology for forming devices such as organic EL elements, or technology for forming various types of interconnections.

What is claimed is:

1. A droplet discharge apparatus that forms a pattern in a desired shape on a base material being processed by discharging liquids having pattern-forming substances, comprising:
   a drawing section, inside which the base material moves entirely straight in one direction, the drawing section having a plurality of droplet discharge heads that are arranged in a direction intersecting with the movement direction of the base material;
   a supply section for supplying the pre-drawing base material toward the drawing section;
   a removal section for extracting the post-drawing base material from the drawing section;
   a checking section for checking the drawing state of the base material after drawing; and
   a correcting head for correcting a defect on the base material, the correcting head being:
      provided adjacent to the drawing section;
      movable in the direction intersecting with the movement direction of the base material at a right angle; and
      having a droplet discharge head,
   wherein the drawing section, the supply section, and the removal section are arranged along an entirely straight one-direction conveyance of the base material, and
   the base material moves from the supply section side to the removal section side with respect to the plurality of droplet discharge heads in the entirely straight one-direction conveyance of the base material, being also the direction that intersects the arrangement direction of the plurality of droplet discharge heads, while discharging the liquids by the droplet discharge heads.

2. A droplet discharge apparatus according to claim 1, wherein the droplet discharge heads are secured to an apparatus main body at the time of drawing.

3. A droplet discharge apparatus according to claim 1, further comprising a cleaning section for cleaning the base material before drawing, between the supply section and the drawing section.

4. A droplet discharge apparatus according to claim 1, further comprising a surface amending section for performing surface amendment of the base material so as to improve wetting characteristics with respect to the liquid, between the supply section and the drawing section.

5. A droplet discharge apparatus according to claim 1, further comprising a heating section for heating the liquids that are discharged onto the base material, between the drawing section and the removal section.

6. A droplet discharge apparatus according to claim 1, wherein the checking section for checking the drawing state of the base material after drawing is provided between the drawing section and the removal section.

7. A color filter manufacturing apparatus for manufacturing a color filter equipped with colored layers of different colors, comprising a plurality of the droplet discharge apparatuses according to claim 1,
   wherein the liquid used in each droplet discharge apparatus containing coloring elements of respectively different colors, so that the droplet discharge apparatuses form colored layers of different colors.

8. A color filter manufacturing apparatus according to claim 7, further comprising a heating apparatus provided in the last level of the plurality of droplet discharge apparatuses, for simultaneously heating the colored layers of different colors that were formed by the droplet discharge apparatuses.

* * * * *